Dec. 5, 1967    H. H. SHAW ET AL    3,356,236
BI-DIRECTIONAL CARGO TRANSFER UNIT
Filed Aug. 5, 1965    4 Sheets-Sheet 1
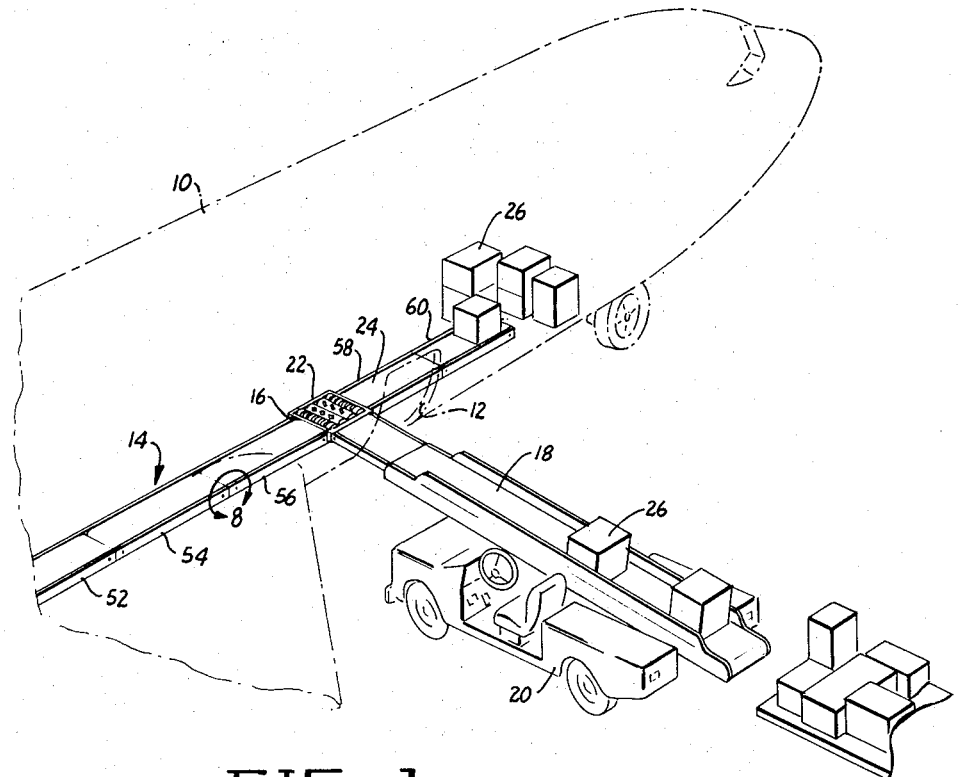
FIG. 1.
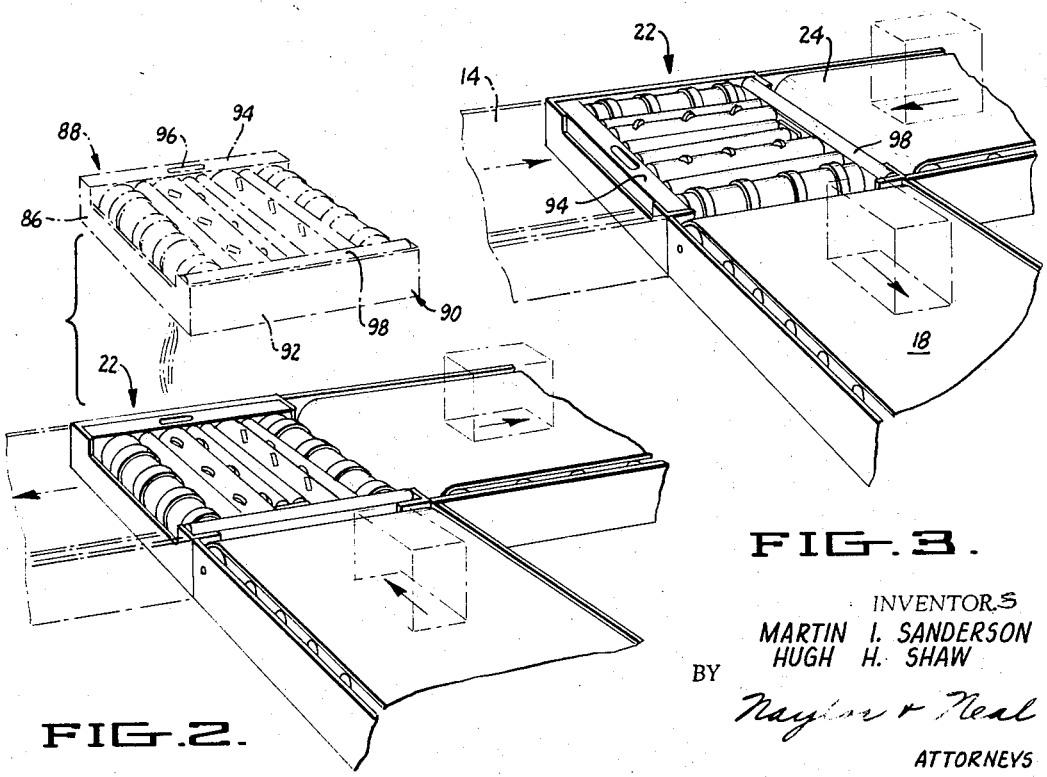
FIG. 2.
FIG. 3.
INVENTORS
MARTIN I. SANDERSON
HUGH H. SHAW
BY
Naylor & Neal
ATTORNEYS INVENTORS
MARTIN I. SANDERSON
HUGH H. SHAW
BY Naylor & Neal
ATTORNEYS INVENTORS
MARTIN I. SANDERSON
HUGH H. SHAW
BY Naylor & Neal
ATTORNEYS

United States Patent Office 3,356,236
Patented Dec. 5, 1967

3,356,236
BI-DIRECTIONAL CARGO TRANSFER UNIT
Hugh H. Shaw and Martin I. Sanderson, Salinas, Calif., assignors, by mesne assignments, to Domino Sugar Company, a corporation of Delaware
Filed Aug. 5, 1965, Ser. No. 477,503
16 Claims. (Cl. 214—38)

ABSTRACT OF THE DISCLOSURE

Conveying apparatus including a turning conveyor for transferring articles from inclined input and discharge conveyors where the turning conveyor has a pair of power driven rollers with a plurality of wheels mounted on the peripheries of the rollers with the wheels arranged to rotate in planes inclined to both the input and delivery conveyors.

---

This invention relates to cargo handling equipment and more particularly to apparatus for handling air freight and to a new turning conveyor used in such apparatus and in other situations.

Substantial advantages have been developed in recent years in equipment and techniques for handling air freight. Many airlines now use all-cargo jet aircraft in which a central cargo deck divides the fuselage into a main cargo compartment and a body compartment. Freight pallet equipment and techniques have been developed for rapid loading and unloading of the main cargo compartment. An example of such equipment is shown in U.S. Patent No. 3,164,274 issued to Thomas R. Herrmann. These advances provide a material reduction in the time necessary for loading and unloading cargo in the main cargo compartment of all-cargo aircraft, but substantial time is still consumed in loading cargo into the belly compartments of all-cargo and passenger aircraft. It is an object of this invention to provide improved apparatus for loading cargo into the belly compartments of aircraft.

The cargo which is normally carried in the belly compartments of aircraft may be referred to as random cargo consisting of irregularly shaped and sized containers which may be rigid or non-rigid. When these containers are to be conveyed into the belly compartment of an aircraft, they must be moved around a turn since the compartment is elongated along the length of the fuselage and has an access hatch which opens laterally in a direction perpendicular to the length of the fuselage. Some attempts have been made to provide turning conveyors which can move cargo around a turn in this way, but these turning conveyors are either excessively complex and expensive or unable to operate effectively on all types of cargo which are found in the random assortment of cargo normally carried in aircraft belly compartments. It is an object of this invention to provide a turning conveyor with which random sized rigid and non-rigid cargo can be conveyed around turns.

In accordance with this invention we have provided a new turning conveyor comprising: a frame with means thereon defining a conveying area over said frame, a pair of elongated support members mounted on said frame adjacent to and underneath said conveying area for rotation about generally parallel and generally horizontal axes, drive means for rotating said support members in the same direction about said axes, and antifriction means mounted on each of said support members distributed axially of and circumferentially around the axis of said support member for reducing the resistance to relative motion between said support member and articles on said conveying area in a direction of motion which is inclined at an angle of about 10 to 90 degrees to a plane perpendicular to said axes. This turning conveyor has proven to be very effective in conveying articles around corners, and the turning conveyor operates very well on a wide variety of articles. When the turning conveyor is operated, articles enter the turning conveyor in a direction parallel to the axes of the support members, rotate through an angle which varies with the article, and leave the turning conveyor in a direction perpendicular to the axes of the support members. A sequence of random articles, including boxes, suitcases, mail bags, and the like, move smoothly over the turning conveyor without jamming or interfering with each other and without requiring any guidance from auxiliary equipment or personnel.

Secondly we have provided in accordance with this invention air freight handling apparatus in which our new turning conveyor is employed. This air freight apparatus comprises:

(a) an aircraft having a fuselage with an elongated cargo compartment therein and a laterally extending cargo hatch extending into said compartment, (b) a first elongated conveyor in said fuselage extending along the length of said compartment and having a conveyor end adjacent to said hatch, (c) a second conveyor extending through said cargo hatch in a direction generally perpendicular to said first conveyor from a position outside said fuselage and having a conveyor end adjacent to said conveyor end of said first conveyor, (d) a turning conveyor in said fuselage at said ends of said first and second conveyors with said turning conveyor having (1) a frame with means thereon defining a conveying area over said frame communicating between said first and second conveyors, (2) a pair of elongated support members mounted on said frame adjacent to and underneath said conveying area for rotation about axes which are generally parallel to a predetermined one of said first and second conveyors, and (3) antifriction means mounted on each of said support members distributed axially of and circumferentially around the axis of the support member for reducing the resistance to relative motion between said support member and articles on said conveying area in a direction of relative motion which is inclined at an angle of about 10 to 90 degrees to a plant perpendicular to said axes, and (e) drive means connected to said first and second conveyors and to said turning conveyor for operating the said predetermined one and the other of said first and second conveyors toward and away from said turning conveyor respectively and for rotating said support members about said axes in a direction to cause the upper surfaces of said support members to move toward said other of said first and second conveyors.

Both the new turning conveyor and the new air freight apparatus include further novel features which facilitate the automatic conveying of articles. Thus, a unique driving mechanism is provided for the turning conveyor whereby driving power for the rotary support members is provided by a single mechanism in a plurality of orientations of the turning conveyor. This driving mechanism permits the turning conveyor to be used very easily for both loading and unloading of cargo. Additionally, a new powered sectional conveyor is provided for conveying cargo along the length of the aircraft belly compartment so that the conveyor may be extended and contracted as the loading and unloading of cargo progresses.

3

Other features and advantages of the invention will become apparent from the following description read in conjunction with the attached drawings in which:

FIG. 1 is a perspective view of the air freight handling apparatus of this invention which employs the new turning conveyor of this invention;

FIG. 2 is an enlarged view of a portion of the apparatus of FIG. 1 with the turning conveyor shown in phantom outline in a second position to which it may be moved. The apparatus is illustrated in FIG. 2 in full line in the condition in which it is employed for loading cargo onto the aircraft;

FIG. 3 is a perspective view similar to FIG. 2 illustrating the configuration of the apparatus employed for unloading cargo from the aircraft;

Figure 10:
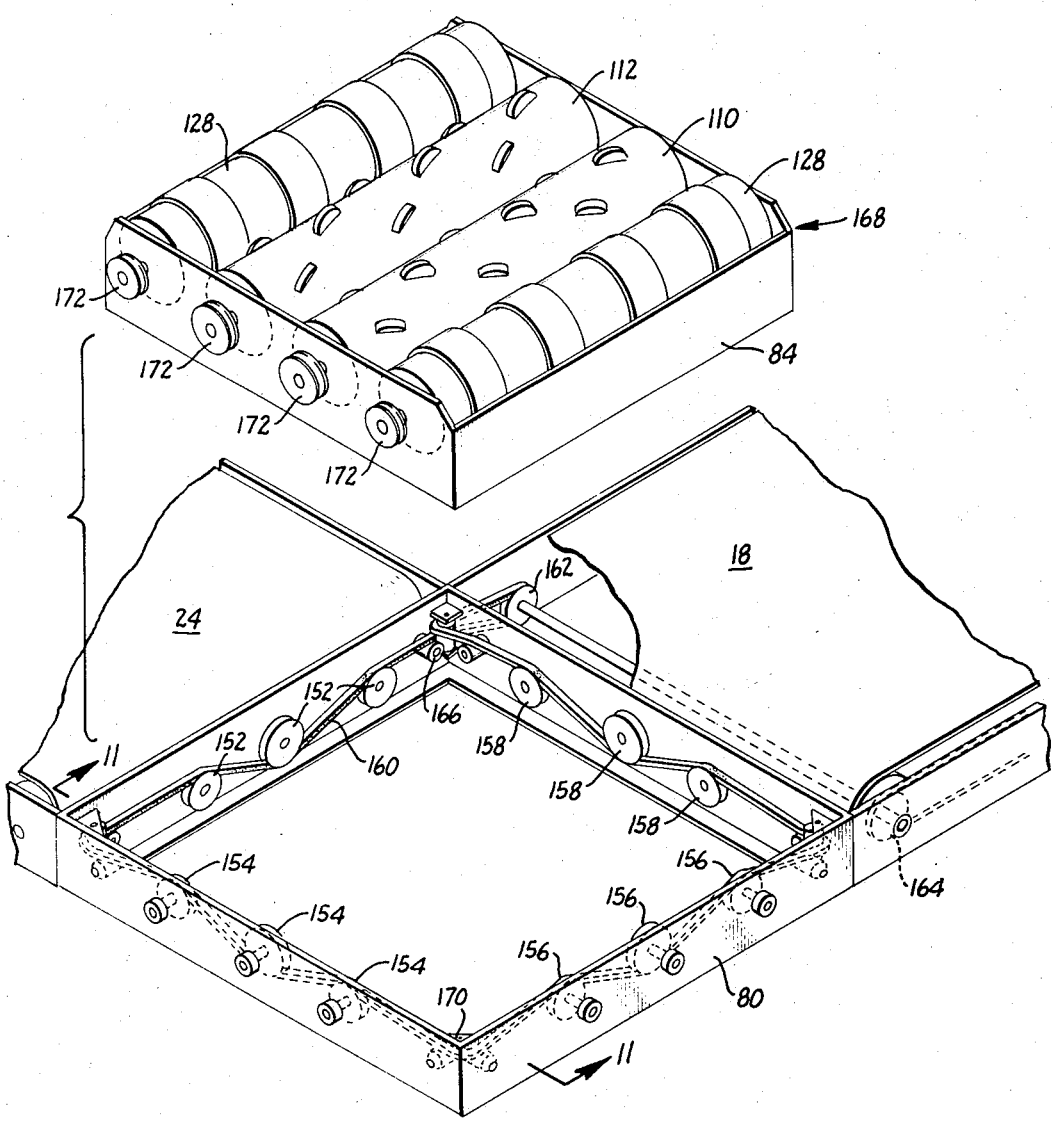
Figure 11:
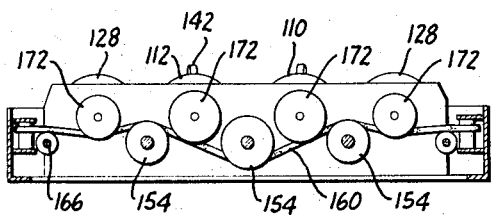

FIG. 10 is a perspective view of an alternative structure for the driving means in the turning conveyor of this invention with one of the parts of the apparatus in FIG. 10 illustrated in an exploded position, and FIG. 11 is a cross sectional view of the apparatus of FIG. 10 taken along the plane indicated at 11—11 in FIG. 10 and illustrating all of the parts of the apparatus in FIG. 10 in their assembled condition.

*Air freight handling apparatus*

Referring now in detail to the drawings and particularly to FIGS. 1–3, the air freight handling apparatus illustrated therein includes an aircraft having an elongated fuselage 10 having an elongated cargo carrying compartment therein extending along the length of the fuselage and a laterally opening cargo hatch 12 extending into the cargo compartment in a direction generally perpendicular to the fuselage. The cargo compartment may be the belly compartment of an all-cargo jet aircraft.

A first conveyor 14 extends longitudinally of the cargo compartment and has a conveyor end 16 adjacent to the hatch 12, and a second conveyor 18 is mounted on a support vehicle 20 and extends through the cargo hatch 12 to a point adjacent to the end 16 of the conveyor 14. A turning conveyor 22 (described in greater detail hereinafter) is positioned between the adjacent ends of the conveyors 18 and 14 for transferring random cargo from one of the conveyors to the other. A third conveyor 24 extends from the turning conveyor 22 longitudinally of the fuselage away from the conveyor 14.

As explained in greater detail hereinafter, the apparatus of FIG. 1 may be operated to load cargo onto the aircraft as follows. The prime mover in the vehicle 20 is operated to drive the conveyor 18 to move containers 26 upwardly along the conveyor 18 to the turning conveyor 22. The upper end of the conveyor 18 is connected to the conveyors 14 and 24 by the mechanism shown in FIG. 7 to operate the conveyors 14 and 24 to move cargo away from the turning conveyor 22. A drive means is provided for rotating the rollers in the turning conveyor 22 in either direction so that the articles conveyed upwardly along the conveyor 18 may be transferred to either of the conveyors 14 and 24 and hence transferred continuously to the ends of the conveyors 14 and 24 where the articles are packed in the cargo compartment of the aircraft.

4

The apparatus of FIG. 1 is operated to unload cargo from the aircraft by operating the prime mover of vehicle 20 to move the conveyor 18 in the reverse direction, and the power coupling between the conveyor 18 and conveyors 14 and 24 operates the conveyors 14 and 24 in reverse direction to convey cargo toward the turning conveyor 22. The turning conveyor 22 is arranged with its axles parallel to the conveyors 14 and 24 and operated to transfer cargo from the conveyors 14 and 24 to the conveyor 18 as illustrated in FIG. 3.

Figure 7:
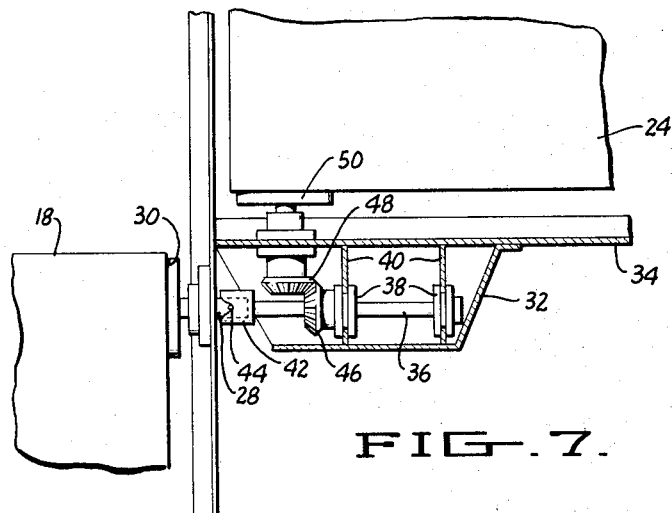
FIG. 7 is an enlarged detailed view of the area indicated by the circle Number 7 in FIG. 4.

With reference to FIGS. 1 and 7, the power coupling between the conveyor 18 and each of the conveyors 14 and 24 includes a stub axle extension 28 on each of the opposite ends of the upper roller 30 of belt conveyor 18. The drive couplings for the conveyors 14 and 24 are similar to each other, and only the coupling for conveyor 24 is illustrated in FIG. 7. This coupling includes a housing 32 mounted on the frame 34 of the conveyor 24 with a drive shaft 36 mounted within the housing 32 in bearings 38 on brackets 40. A removable socket 42 is mounted on the outer end of the drive shaft 36 and is slotted as illustrated in FIG. 7 so that the socket 42 may be moved into driving engagement with a pin 44 in the stub axle extension 28 when the frame 34 of the conveyor 24 is placed in the aircraft cargo compartment after insertion of the conveyor 18 into that compartment. A bevel gear 46 is mounted on the drive shaft 36 and is in mesh with a second bevel gear 48 mounted on the end roller 50 of belt conveyor 24. By this mechanism, driving power is transferred from the upper end of the conveyor 18 to each of the conveyors 14 and 24.

Figure 8:
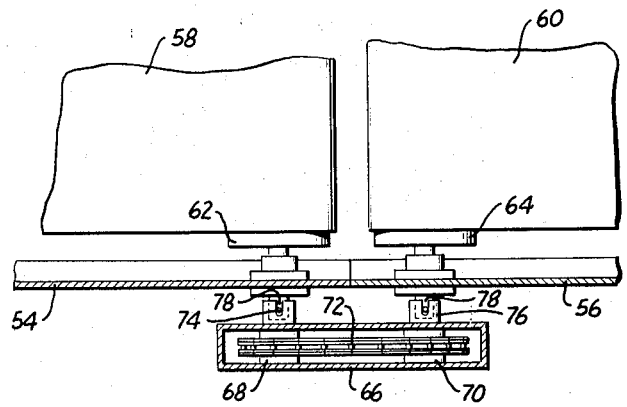
FIG. 8 is an enlarged detailed view of the structure in the area of circle Number 8 in FIG. 1.

With reference to FIGS. 1 and 8, it will be noted that each of the conveyors 14 and 24 is made up of a plurality of longitudinally aligned conveyor sections 52, 54, 58, and 60. The two conveyor sections 56 and 58 adjacent to the conveyor 18 and driven by means of the drive mechanism illustrated in FIG. 7, and driving means is provided for the other conveyor sections by means of the removable connectors shown in FIG. 8.

Thus, with reference to FIG. 8, each of the conveyor sections 54 and 56 has a conveyor belt 58 and 60 respectively and trained over idler rollers 62 and 64 respectively at opposite ends of the two sections. The roller 64 is driven in rotation by the belt 60 which is in turn driven by the roller 50 (FIG. 7) at the end of the conveyor 14 adjacent to the conveyor 18. A removable coupling is provided for transmitting rotary power from the roller 64 to the roller 62. This coupling includes a housing 66 having a pair of sprockets 68 and 70 mounted therein and connected by a chain 72. The axles of the sprockets 68 and 70 protrude from the housing 66 as indicated at 74 and 76 respectively and are provided with slotted sockets 78 which receive projecting portions of the axles of rollers 62 and 64. As illustrated in FIG. 8, the protruding portions of the roller axles contain transverse pins which fit into slots 78 in the sockets 74 and 76 so that the connector provides rotary driving connection between the rollers 64 and 62 while permitting the connector to be pulled off of the axle extensions in a direction parallel to the axes of the rollers 62 and 64.

It will thus be apparent that the apparatus of FIGS. 1, 7 and 8 may be employed during loading of cargo in the following way: with the apparatus initially assembled as illustrated in FIG. 1, cargo may be transported up the conveyor 18 and around turning conveyor 22 and down along the length of conveyor 14 while the cargo is stacked in the aft end of the cargo compartment. As the location of cargo stacking progresses along the length of the conveyor 14, the connector 66 between conveyor sections 52 and 54 may be removed to render conveyor section 52 inoperative, and conveyor section 52 may be removed or merely buried under cargo in the cargo compartment. In a similar manner, successive conveyor sections may be rendered inoperative as the cargo compartment is filled toward the cargo hatch 12, and when the cargo is subsequently unloaded, the conveyor sections 56, 54 and 52 may be reconnected progressively.

The turning conveyor

The details of the construction of the turning conveyor 22 are best illustrated in FIGS. 2-6. With reference to these figures, the turning conveyor includes an outer frame 80 which is mounted on the upper end of the frame of conveyor 18. The outer frame 80 has a square interior opening 82 in which a square inner frame 84 is removably mounted. The square inner frame includes side plates 86, 88, 90, and 92 and a top plate 94 provided with a hand opening 96. A roller 98, extending between side plates 86 and 90 is mounted on the top of the turning conveyor at the edge thereof opposite to the top plate 94.

An interior wall 100 extends between the side plates 86 and 90 adjacent to the top plate 94, and an interior wall 102 extends between the side plates 86 and 90 adjacent to the roller 98. A central bracket 104 is provided on the wall 102, and a bracket 106 is provided on the end wall 88 underneath the hand opening 96. A lifting handle 108 is mounted on each of the brackets 104 and 106 to permit the turning conveyor to be picked up from the solid line position of FIG. 2 to the phantom line position.

A pair of rollers or rotary support members 110 and 112 extend between the interior walls 100 and 102 generally parallel to the length of conveyor 18 with each of the rollers mounted on a central axle 114 which is in turn mounted in bearings 116 in the end walls 100 and 102. The outer ends of the axles 114 are provided with sprockets 118, and a chain 120 extends over the sprockets 118 and a third sprocket 122 which is mounted on the axle of a hydraulic motor 124. The hydraulic motor 124 has a pair of fluid conduits 126 which extend to a pump on vehicle 20 through a reversing valve whereby the direction of rotation of the rollers 110 and 112 may be reversed.

A pair of conveying rollers 128 are mounted on the turning conveyor in a manner similar to the mounting of the rollers 110 and 112 with one of the rollers 128 mounted on each of the opposite sides of the rollers 110 and 112. Each of the rollers 128 is provided with a sprocket 130 which is connected by a chain 132 to a second sprocket 134 on the axle of one of the rollers 110 and 112 so that responsive to operation of the hydraulic motor 24 all four of the rollers 110, 112, and 128 rotate in the same direction.

Figure 4:
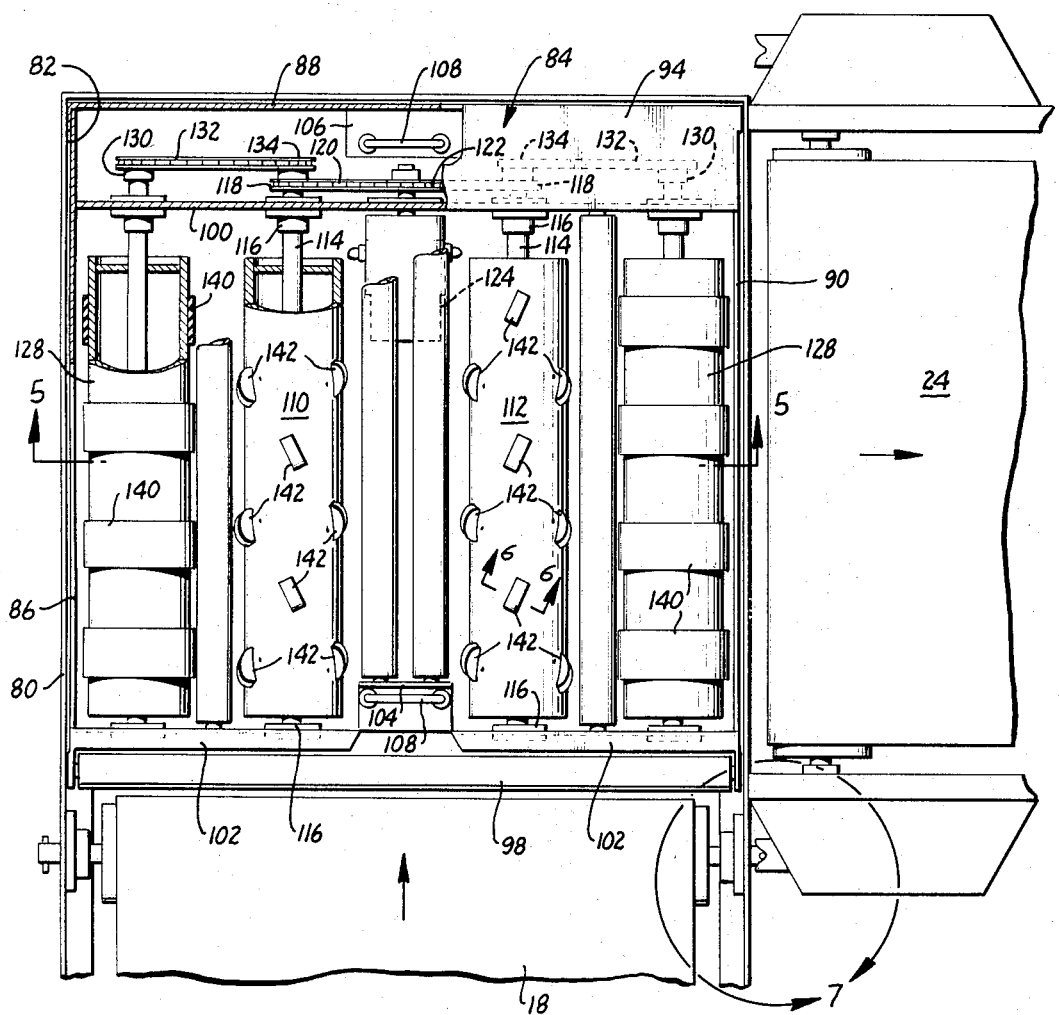
FIG. 4 is a plan view of a portion of the apparatus of FIG. 2 on a larger scale.
Figure 5:
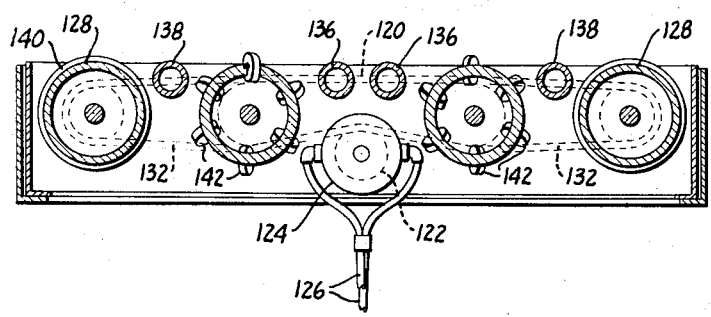
FIG. 5 is a cross sectional view of the turning conveyor shown in FIG. 4 taken along the plane indicated at 5—5 in FIG. 4.

A pair of idler rollers 136 are mounted between the rollers 110 and 112, and an idler roller 138 is mounted adjacent to each of the rollers 128 to prevent flexible objects from moving into the space between the driven rollers. As best seen in FIG. 4, the rollers 128 are provided with peripheral rubberized coverings which insure good driving contact between the rollers and articles being conveyed by the apparatus.

Figure 6:
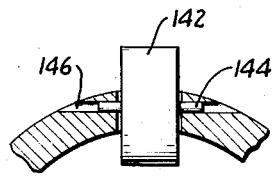
FIG. 6 is a detailed sectional view taken along the plane indicated at 6—6 in FIG. 4.

As illustrated in FIGS. 4 and 6, a plurality of wheels 142 are mounted on each of the rollers 110 and 112 with the wheels 142 on each of the rollers distributed axially of and circumferentially around the axis of the roller. Each of the wheels 142 is conveniently the type of ball bearing supported wheel which is employed on roller skates, and the wheels may be mounted on the rollers in any suitable means as by supporting the axles 144 of the wheels in holes 146 bored in the periphery of the rollers 110 and 112. Alternatively, the support mechanism for the wheels may be welded to the interior surface of the rollers, or each of the rollers 110 and 112 may be constructed in the form of a support member for the wheels 142 where the support member rotates about the axis of axles 114 but does not necessarily have a cylindrical exterior surface.

Each of the wheels 142 is mounted on one of the rollers 110 or 112 to rotate in a plane which is inclined at a predetermined angle to a plane perpendicular to the axis of that roller 110 or 112. This predetermined angle may vary between about 10 and 90 degrees, and preferably is within the range of about 10 to 80 degrees. We have found that very satisfactory results are obtained when the wheels are mounted as illustrated in FIG. 4 with the plane of rotation of the wheel 142 inclined to a diametrical plane of the roller 112 by an angle of 60 degrees. The rollers 142 facilitate movement of cargo onto the turning conveyor in a direction parallel to the axles 114, and the rollers 142 facilitate turning of the cargo after it has entered the turning conveyor. The planes of rotation of the wheels 142 should not be perpendicular to the axles 114 (predetermined angle of 0 degrees) because the rollers 142 thus oriented would interfere with movement of cargo onto the turning conveyor. Satisfactory results with the turning conveyor may be obtained in some situations where the rollers 142 are mounted with their planes of rotation parallel to the axles 114 since the wheels 142 thus oriented facilitate entry of cargo onto the turning conveyor, but it has been found with the rollers 142 oriented in this way (predetermined angle of 90 degrees) the rollers 142 have a tendency to kick and tip articles being conveyed over the turning conveyor. It is for this reason that it is stated above that the predetermined angle of inclination of the plane of rotation of the wheels 142 to a diametric plane of the rollers should be between 10 and 90 degrees and is preferably between 10 and 80 degrees.

Figure 9:
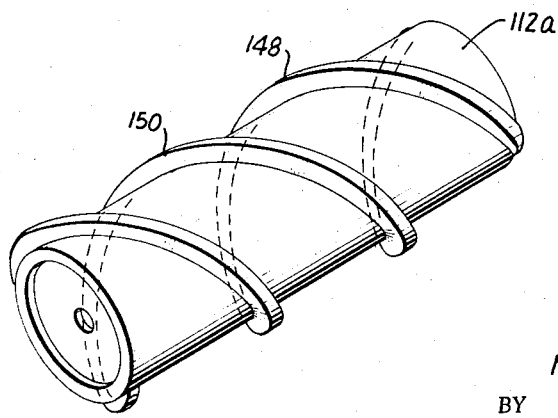
FIG. 9 is a perspective view of an alternative form of apparatus employed in the turning conveyor of this invention.

In some situations it may be possible or desirable to employ other antifriction means on the rollers 110 and 112 in place of the wheels 142, though the wheels 142 are by far the most preferred form of antifriction means to be used on the rotary support members 110 and 112 in accordance with this invention. A form of antifriction means which may be employed in some situations in the place of the wheels 142 is illustrated in FIG. 9 where the rotary support member 112a is provided with a pair of helical antifriction bands 148 and 150 which are preferably made out of a low friction material such as polytetrafluoroethylene which is bonded to the periphery of the rotary support member 112a by any suitable means. The pitch angle of the helix of each of the strips 148 and 150 is equal to the predetermined angle mentioned above at which in any particular situation it is desirable to incline the plane of rotation of the wheels 142 to the diametric plane of the roller.

From the above structural description, the operation of the turning conveyor will be fairly apparent. With the turning conveyor arranged as illustrated in FIGS. 2 and 4, the conveyors 18 and 24 are driven to move cargo toward and away from the turning conveyor respectively. Articles roll onto the turning conveyor in a direction parallel to the axes of rotation of the rollers 110 and 112, and the rollers 110, 112, and 128 are rotated by the hydraulic motor 124 in a direction to move the upper surface of the rollers toward the conveyor 24. In this manner, articles delivered onto the turning conveyor are discharged onto the conveyor 24.

As indicated above, the hydraulic motor 24 is reversible so that when cargo is being conveyed up the conveyor 18, the direction of rotation of rollers 110, 112, and 128 may be reversed to deliver cargo to the conveyor 114 instead of the conveyor 124.

When it is desirable to discharge cargo from the aircraft, the prime mover of the vehicle 20 is operated as mentioned above to convey cargo toward the turning conveyor on the conveyors 14 and 24 and to convey cargo away from the conveyor on the conveyor 18 as illustrated in FIG. 3. In this situation, the inner frame 84 of the turning conveyor is lifted out of the outer frame 80 as indicated in FIG. 2 and replaced in the outer frame 80 after rotating the inner frame through an angle of 90 degrees to align the axles of rollers 110, 112, and 128 with the length of the conveyors 14 and 24. With this arrangement, cargo can enter the turning conveyor from either end of the rollers 110 and 112 and be turned from either of the conveyors 14 and 24 to the conveyor 18.

In an alternative form of the turning conveyor illustrated in FIGS. 10 and 11, the drive mechanism including hydraulic motor 124 for the turning conveyor is eliminated, and a unique arrangement is provided for driving the rollers 110, 112, and 128 in any configuration of the turning conveyor. In the structure of FIGS. 10 and 11, the outer frame 80 of the turning conveyor is provided with four groups of pulleys 152, 154, 156, and 158 on the four interior sides of the square opening in the outer frame 80. A single endless belt 160 is entrained over the pulleys 152–158 and over a drive pulley 162 mounted in the upper end of the conveyor 18. Suitable means illustrated schematically at 164 are provided for driving the drive pulley 162 responsive to operation of the conveyor 18, and guide rollers, for instance rollers 166 are provided for guiding the belt 160 around corners in its path.

The inner frame 84 of the turning conveyor is provided with beveled corners as indicated at 168 which cooperate with corner plates 170 to position the inner frame 84 in the outer frame 80 when the apparatus is assembled. The inner frame 84 is similar to the inner frame 84 of the apparatus illustrated in FIG. 4 except that the rollers 110, 112, and 128 are freely rotatable in the inner frame and are provided with pulleys 172 on their axles with the pulleys so positioned that they will rest on the belt 160 in driven engagement therewith along any one of the four sides of the frame 80. With this arrangement, the inner frame 84 may be placed in the outer frame 80 with the rollers 110 and 112 aligned with either the conveyor 18 or the conveyor 24 and with the rollers 110, 112, and 124 rotating in either desired direction depending upon which way the inner frame 84 is placed into the outer frame 80.

It will be apparent that the turning conveyor of this invention has a wide variety of applications beyond its application in the air freight handling apparatus illustrated in FIG. 1. For instance, the turning conveyor 22 may be employed very easily in a conveyor distribution system where articles conveyed along an elongated conveyor are to be selectively diverted to a plurality of lateral conveyors. Thus, in the configuration of apparatus illustrated in FIG. 2, where means are provided to drive the conveyors 14 and 24 in the same direction, and where selectively operable means are provided for operating the turning conveyor 22, articles conveyed along the conveyor 14 will move straight across the turning conveyor 22 when the turning conveyor is not operating, but when the turning conveyor is operated, the articles will be diverted to the conveyor 18. In this regard, it will be noted in the various figures that the wheels 142 on the two rollers 110 and 112 are inclined with respect to diametric planes of these rollers by angles which are equal and opposite. Thus, viewing the rollers 142 in FIG. 4, when an article is moved onto the turning conveyor while the rollers 110 and 112 are not turning, the wheels 142 on the two rollers will both tend to divert articles away from the other roller, but the opposite inclinations of the two sets of wheels counterbalance each other so that an article pushed onto the turning conveyor parallel to the axles 114 will move straight across the turning conveyor if the rollers 110 and 112 are not turning.

While certain specific structural arrangements of this invention have been illustrated and described in detail herein, it is obvious that many modifications thereof may be made without departing from the scope of the invention.

We claim:

1. A conveyor roller comprising: an elongated support member having a central axis of rotation and a plurality of wheels mounted on said support member at positions distributed axially of and circumferentially around said axis with each of said wheels mounted on said support member for rotation in a plane which is inclined at an angle of about 10 to 80 degrees to a plane perpendicular to said axis.

2. A turning section for a conveyor comprising: a frame with means thereon defining a conveying area over said frame, conveying means for conveying articles onto and off of said conveying area in first and second predetermined directions which are inclined at a substantial angle with respect to each other, an elongated support member mounted on said frame for rotation about an axis, drive means for rotating said support member about said axis, and a plurality of wheels mounted on said support member at positions distributed axially of and circumferentially around said axis with each of said wheels mounted on said support member for rotation in a plane which is inclined at an angle of about 10 to 80 degrees to a plane perpendicular to said axis and is inclined to both of said predetermined directions.

3. A turning conveyor comprising: a frame with means thereon defining a conveying area over said frame, conveying means for conveying articles onto and off of said conveying area in first and second predetermined directions which are inclined at a substantial angle with respect to each other, a pair of elongated support members mounted on said frame adjacent to and underneath said conveying area for rotation about generally parallel and generally horizontal axes, drive means for rotating said support members in the same direction about said axes, and antifriction means mounted on each of said support members extending into said conveying area for engaging articles in said conveying area distributed axially of and circumferentially around the axis of said support member for reducing the resistance to relative motion between said support member and articles on said conveying area in a direction of motion which is inclined at an angle of about 10 to 80 degrees to a plane perpendicular to said axes and is inclined to both of said predetermined directions.

4. A turning conveyor comprising a frame with means thereon defining a conveying area over said frame, a pair of elongated rollers mounted on said frame adjacent to and underneath said conveying area for rotation about generally parallel and generally horizontal axes, drive means for rotating said rollers simultaneously with their upper surfaces moving in the same direction, and a plurality of wheels mounted on each of said rollers at positions distributed axially of and circumferentially around the axis of the roller with each of said wheels mounted for rotation in a plane which is inclined at an angle of about 10 to 80 degrees to a plane perpendicular to said axes and with said rollers extending into said conveying area for engaging articles in said conveying area, whereby, random articles conveyed into said conveying area along a direction parallel to said axes will be turned and conveyed out of said conveying area along a direction perpendicular to said axes.

5. The turning conveyor of claim 4 characterized further in that said means on said frame defining a conveying area include an auxiliary roller on each side of said pair of rollers and mounted adjacent to and underneath said conveying area for rotation about an axis parallel to said axes, and said auxiliary rollers are connected to said drive means for rotation in the same direction as said pair of rollers.

6. The turning conveyor of claim 4 characterized further in that said planes of rotation of said wheels on the two rollers of said pair are inclined to the length of said rollers at equal and opposite angles.

7. The turning conveyor of claim 4 characterized further in that said frame has a horizontal shape which is square; a second frame having a square interior opening is mounted on said frame with said frame removably received in said opening, and said drive means includes driven means connected to said pair of rollers and first and second driving means on adjacent sides of said second frame with said driving means connected together for simultaneous operation and located on said two adjacent sides in similar positions with said first driving means in driving engagement with said driven means, whereby said turning conveyor can be operated by said drive means in two perpendicular positions.

8. Apparatus for conveying random articles which comprises:
(a) first and second conveyors inclined to each other with conveyor ends adjacent to each other,
(b) a turning conveyor disposed at said ends of said first and second conveyors with said turning conveyor having
   (1) a frame with means thereon defining a conveying area over said frame communicating between said first and second conveyors,
   (2) a pair of elongated support members mounted on said frame adjacent to and underneath said conveying area for rotation about axes which are generally parallel to said first conveyor, and
   (3) antifriction means mounted on each of said support members distributed axially of and circumferentially around the axis of the support member for reducing the resistance to relative motion between said support member and articles on said conveying area in a direction of relative motion which is inclined at an angle of about 10 to 90 degrees to a plane perpendicular to said axes, and
(c) drive means connected to said first and second conveyors and to said turning conveyor for operating said first and second conveyors to move articles toward and away from said turning conveyor respectively and for rotating said support members about said axes in a direction to cause the upper surfaces of said support members to move toward said second conveyor.

9. The apparatus of claim 8 characterized further in that:
(a) a second frame is connected between said first and second conveyors and provided with a square opening in its upper surface,
(b) said frame of said turning conveyor has a square exterior shape and is removably mounted in said opening in said second frame, and
(c) said drive means comprises:
   (1) reversable drive means for said first and second conveyors,
   (2) driven means on one side of said frame of said turning conveyor for rotating said support members, and
   (3) driving means on said second frame with said driving means having
      (a) first driving means mounted at one side of said square opening in driving engagement with said driven means, and
      (b) second driving means similar to said first driving means and adapted to drive said driven means with said second driving means mounted at a second side of said square opening which is perpendicular to said first side of said square opening.

10. Apparatus for conveying random articles which comprises:
(a) first and second conveyors inclined to each other with conveyor ends adjacent to each other.
(b) a turning conveyor disposed at said ends of said first and second conveyors with said turning conveyor having
   (1) a frame with means thereon defining a conveying area over said frame communicating between said first and second conveyors.
   (2) a pair of elongated support members mounted on said frame adjacent to and underneath said conveying area for rotation about axes which are generally parallel to said first conveyor, and
   (3) a plurality of wheels mounted on each of said support members at positions distributed axially of and circumferentially around the axis of said support member with each of said wheels mounted for rotation in a plane which is inclined at an angle of about 10 to 80 degrees to a plane perpendicular to said axis, and
(c) drive means connected to said first and second conveyors and to said turning conveyor for operating said first and second conveyors to move articles toward and away from said turning conveyor respectively and for rotating said support members about said axes in a direction to cause the upper surfaces of said support members to move toward said second conveyor.

11. The apparatus of claim 10 characterized further in that:
(a) a second frame is connected between said first and second conveyors and provided with a square opening in its upper surface.
(b) said frame of said turning conveyor has a square exterior shape and is removably mounted in said opening in said second frame, and
(c) said drive means comprises:
   (1) reversable drive means for said first and second conveyors,
   (2) driven means on one side of said frame of said turning conveyor for rotating said support members, and
   (3) driving means on said second frame with said driving means having
      (a) first driving means mounted at one side of said square opening in driving engagement with said driven means, and
      (b) second driving means similar to said first driving means and adapted to drive said driven means with said second driving means mounted at a second side of said first side of said square opening.

12. Apparatus for handling air-freight which comprises:
(a) an aircraft having a fuselage with an elongated cargo compartment therein and a laterally extending cargo hatch extending into said compartment,
(b) a first elongated conveyor in said fuselage extending along the length of said compartment and having a conveyor end adjacent to said hatch,
(c) a second conveyor extending through said cargo hatch in a direction generally perpendicular to said first conveyor from a position outside said fuselage and having a conveyor end adjacent to said conveyor end of said first conveyor,
(d) a turning conveyor in said fuselage at said ends of said first and second conveyors with said turning conveyor having
   (1) a frame with means thereon defining a conveying area over said frame communicating between said first and second conveyors,
   (2) a pair of elongated support members mounted on said frame adjacent to and underneath said conveying area for rotation about axes which are generally parallel to a predetermined one of said first and second conveyors, and
   (3) antifriction means mounted on each of said support members distributed axially of and circumferentially around the axis of the support member for reducing the resistance to relative motion between said support member and articles on said conveying area in a direction of relative motion which is inclined at an angle of about 10 to 90 degrees to a plane perpendicular to said axes, and (e) drive means connected to said first and second conveyors and to said turning conveyor for operating the said predetermined one and the other of said first and second conveyors toward and away from said turning conveyor respectively and for rotating said support members about said axes in a direction to cause the upper surfaces of said support members to move toward said other of said first and second conveyors.

13. Apparatus for handling air-freight which comprises:
(a) an aircraft having a fuselage with an elongated cargo compartment therein and laterally extending cargo hatch extending into said compartment,
(b) a first elongated conveyor in said fuselage extending along the length of said compartment and having a conveyor end adjacent to said hatch,
(c) a second conveyor extending through said cargo hatch in a direction generally perpendicular to said first conveyor from a position outside said fuselage and having a conveyor end adjacent to said conveyor end of said first conveyor,
(d) a turning conveyor in said fuselage at said ends of said first and second conveyors with said turning conveyor having
(1) a frame with means thereon defining a conveying area over said frame communicating between said first and second conveyors,
(2) a pair of elongated support members mounted on said frame adjacent to and underneath said conveying area for rotation about axes which are generally parallel to a predetermined one of said first and second conveyors, and
(3) a plurality of wheels mounted on each of said support members at positions distributed axially of and circumferentially around the axis of said support member with each of said wheels mounted for rotation in a plane which is inclined at an angle of about 10 to 80 degrees to a plane perpendicular to said axis, and
(e) drive means connected to said first and second conveyors and to said turning conveyor for operating the said predetermined one and the other of said first and second conveyors toward and away from said turning conveyor respectively and for rotating said support members about said axes in a direction to cause the upper surfaces of said support members to move toward said other of said first and second conveyors.

14. The apparatus of claim 13 characterized further in that:
(a) a second frame is connected between said first and second conveyors and provided with a square opening in its upper surface,
(b) said frame of said turning conveyor has a square exterior shape and is removably mounted in said opening in said second frame, and
(c) said drive means comprises:
(1) reversible drive means for said first and second conveyors,
(2) driven means on one side of said frame of said turning conveyor for rotating said support members, and
(3) driving means on said second frame with said driving means having
(a) first driving means mounted at one side of said square opening in driving engagement with said driven means, and
(b) second driving means similar to said first driving means and adapted to drive said driven means with said second driving means mounted at a second side of said square opening which is perpendicular to said first side of said square opening.

15. The apparatus of claim 14 characterized further by the inclusion of:
(a) a third conveyor mounted in said fuselage in alignment with said first conveyor and extending from said turning conveyor away from said first elongated conveyor,
(b) reversable drive means for said third conveyor, and
(c) reversing means for said driving means on said second frame of said turning conveyor.

16. The apparatus of claim 15 characterized further in that said first conveyor comprises:
(a) a plurality of longitudinally spaced and aligned conveyor sections removably mounted in said fuselage with each of said sections comprising:
(1) a frame portion, and
(2) conveyor means mounted on the frame portion for conveying cargo over said frame portion and including a first roller at one end of said frame portion and a second roller at the other end of said frame portion with axles protruding laterally of said frame from each of said rollers and means connecting said rollers for rotating each of said rollers responsive to rotation of the other roller, and
(b) a removable power connector connecting each of said sections with each of said power connectors comprising:
(1) a frame,
(2) a pair of sockets rotatably mounted on said frame and removably connected to the adjacent protruding axles of two of said conveyor sections for rotation with said axles, and
(3) connecting means connecting said sockets together for rotating each of said sockets responsive to rotation of the other socket.

References Cited

UNITED STATES PATENTS

| | | | |
|---|---|---|---|
| 1,123,851 | 1/1915 | Cooper | 193—37 |
| 2,710,105 | 6/1955 | Schwartz. | |
| 2,873,021 | 2/1959 | McWhorter | 198—109 |
| 3,016,127 | 1/1962 | Cooper | 198—184 |

GERALD M. FORLENZA, *Primary Examiner.*

ALBERT J. MAKAY, *Examiner.*